(12) United States Patent
Ernst et al.

(10) Patent No.: US 8,625,161 B2
(45) Date of Patent: Jan. 7, 2014

(54) MULTIBIT DIGITAL HALFTONING, INDEXING 2D AND 3D LOOKUP TABLES

(75) Inventors: Larry Ernst, Longmont, CO (US); Tadanobu Inoue, Kanagawa-ken (JP); Mikel Stanich, Longmont, CO (US); Chai W. Wu, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 12/621,614

(22) Filed: Nov. 19, 2009

(65) Prior Publication Data

US 2011/0116135 A1    May 19, 2011

(51) Int. Cl.
*H04N 1/405* (2006.01)
*H04N 1/40* (2006.01)

(52) U.S. Cl.
USPC .......................................... 358/3.06; 358/3.23

(58) Field of Classification Search
None
See application file for complete search history.

(56) References Cited

U.S. PATENT DOCUMENTS

| | | | |
|---|---|---|---|
| 5,243,443 A * | 9/1993 | Eschback | 358/3.03 |
| 5,940,541 A | 8/1999 | Donelly | |
| 6,995,873 B1 | 2/2006 | Mitchell et al. | |
| 7,050,200 B2 | 5/2006 | Sanger | |
| 7,079,290 B2 | 7/2006 | Crossland et al. | |
| 2002/0118393 A1 * | 8/2002 | Thakur | 358/3.06 |

OTHER PUBLICATIONS

Ostromoukhov et al., Fast Hierarchal Importance Sampling With Blue Noise Properties, Dialog & AMC Library, vol. 23, No. 3, pp. 488-495, 2004.

* cited by examiner

*Primary Examiner* — Twyler Haskins
*Assistant Examiner* — Christopher D Wait
(74) *Attorney, Agent, or Firm* — Cantor Colburn LLP; Ann Dougherty

(57) ABSTRACT

Digital halftoning processes for producing a halftone image include, for each pixel in the image: indexing a two-dimensional look up table using a position of the pixel, identifying a threshold value for the pixel from the two-dimensional look up table, creating an index that indexes a three-dimensional lookup table using the threshold value and the position of the pixel, and obtaining an output value for the pixel from the three-dimensional look up table via the index. The digital halftoning processes also produce a halftone representation of the image from output values for corresponding pixels.

18 Claims, 3 Drawing Sheets

MULTIBIT DIGITAL HALFTONING, INDEXING 2D AND 3D LOOKUP TABLES

BACKGROUND

The present disclosure relates generally to halftoning and, in particular, to multibit digital halftoning using lookup tables.

Halftoning refers to a process or technique in image reproduction that utilizes varying sizes of dots (and/or varying degrees of spatial separation among these dots) to simulate a continuous tone image using a single color of ink (i.e., without the use of a wide or infinite range of continuous tones) by the arrangement of halftone dots such that they appear blended to the human eye when viewed at an appropriate distance.

Digital halftoning techniques have been developed for implementing halftone images. Digital halftoning generates a bitmap within which each monochrome picture element or pixel may be on or off, or set to ink or no ink. The bitmap corresponds bit-for-bit with an image (e.g., displayed on a computer screen or printed on paper). A digital halftone cell (whereby a cell relates to a corresponding area (size and location) of the continuous-tone input image) contains groups of monochrome pixels within the same-sized cell area.

Currently, a widely used class of digital halftoning techniques utilize look up tables (LUTs) that produce quality halftone images, but typically require a significant amount of memory. For example, for multibit digital halftoning, a three-dimensional (3D) look up table is utilized that accommodates two-dimensional (2D) spatial data for the image and one-dimensional (1D) gray levels. The spatial 2D data potentially require entries in the order of 100,000 s, and with the number of input gray levels in the range of 8-10 bits per table entry, this results in a table with potentially millions or tens of millions of entries. In another solution, a two-dimensional (2D) look up table and a one-dimensional (1D) look up table are used to reduce the storage requirements associated with 3D look up table implementations; however, this solution lacks the flexibility of a fully three-dimensional (3D) lookup table, as the number of possible 3D look up tables far exceeds the number of possible 2D or 1D lookup tables.

What is needed, therefore, is a way to perform digital halftoning for images that offers flexibility of implementation while minimizing the amount of storage required for the implementation.

BRIEF SUMMARY

Embodiments of the invention include methods for implementing digital halftoning for an image. A method includes, for each pixel in the image: indexing a two-dimensional look up table using a position of the pixel, identifying a threshold value for the pixel from the two-dimensional look up table, creating an index that indexes a three-dimensional lookup table using the threshold value and the position of the pixel, and obtaining an output value for the pixel by indexing the three-dimensional look up table via the index. The method further includes producing a halftone representation of the image from output values obtained for corresponding pixels.

Further embodiments include a system for implementing digital halftoning of an image. The system includes a computer processing device and a halftoning engine executing on the computer processing device. The halftoning engine implements a method. For each pixel in the image, the method includes indexing a two-dimensional look up table using a position of the pixel, identifying a threshold value for the pixel from the two-dimensional look up table, creating an index that indexes a three-dimensional lookup table using the threshold value and the position of the pixel, and obtaining an output value for the pixel by indexing the three-dimensional look up table via the index. The method also includes producing a halftone representation of the image from output values obtained for corresponding pixels.

Further embodiments include a computer program product for implementing digital halftoning of an image. The computer program product includes a computer readable storage medium having computer readable program code embodied therewith, the computer readable program code configured to implement a method. For each pixel in the image, the method includes indexing a two-dimensional look up table using a position of the pixel, identifying a threshold value for the pixel from the two-dimensional look up table, creating an index that indexes a three-dimensional lookup table using the threshold value and the position of the pixel, and obtaining an output value for the pixel by indexing the three-dimensional look up table via the index. The method also includes producing a halftone representation of the image from output values obtained for corresponding pixels.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Methods, systems, and computer program products for implementing multibit digital halftoning are provided in exemplary embodiments. The multibit digital halftoning performs digital halftoning for images that is flexible and minimizes the amount of storage required for implementation, as compared to existing techniques. The multibit digital halftoning processes utilize a two-dimensional (2D) look up table (LUT) along with a reduced size three-dimensional (3D) look up table, thereby reducing the memory requirements associated with current 3D look up table implementations.

Figure 1:
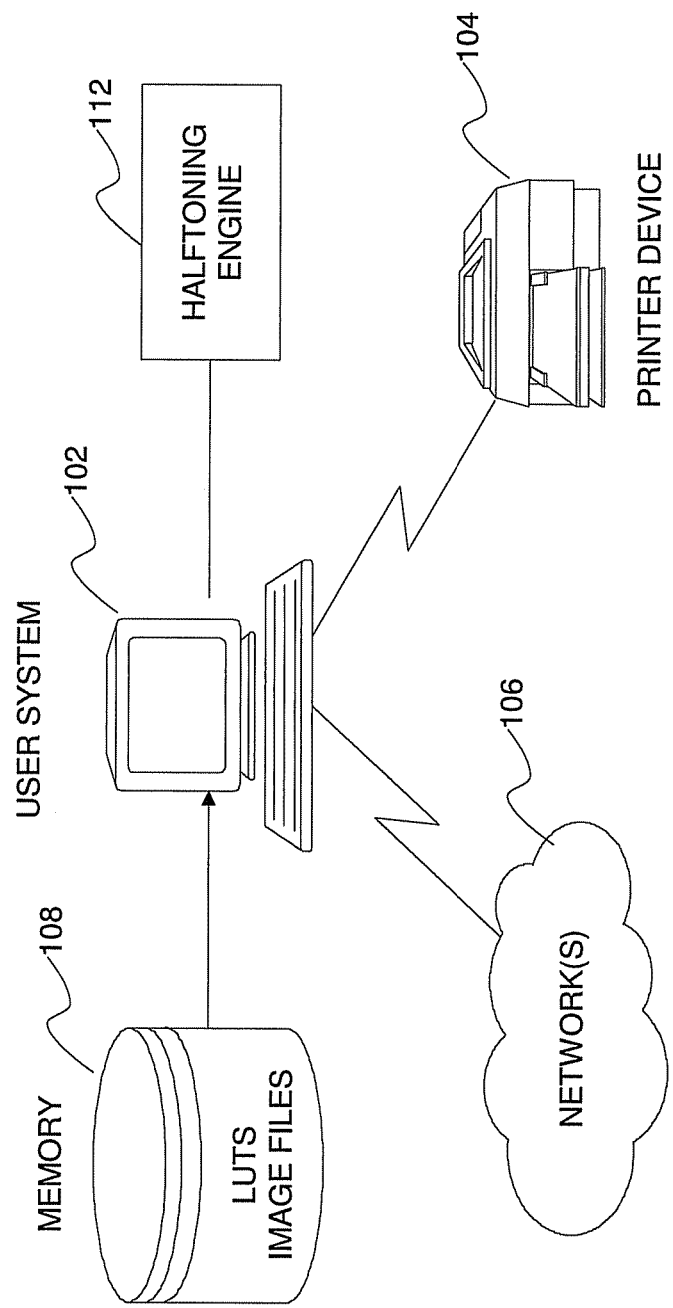
FIG. 1 is a portion of system upon which multibit digital halftoning processes may be implemented in exemplary embodiments.

Turning now to FIG. 1, a system 100 for implementing the exemplary multibit digital halftoning processes will now be described. In an exemplary embodiment, the system 100 includes a user system 102 executing computer instructions for performing multibit digital halftoning. User system 102 may comprise a high-speed computer-processing device, such as a mainframe computer, to manage the volume of operations governed by an entity for which the multibit digital halftoning is used. Alternatively, the user system 102 may be implemented using a general-purpose computer executing a computer program for carrying out the processes described herein. The user system 102 may be a personal computer (e.g., a lap top, a personal digital assistant) or a host attached terminal. The user system 102 includes input/output devices (e.g., keyboard, mouse, display, monitor), and may communicate with external devices, such as a scanner, printer, and/or facsimile (e.g., a printer device 104) either directly through cabling or over a network.

In an exemplary embodiment, the user system 102 contains internal memory 108 for storing data in support of the multibit digital halftoning. Alternatively, a separate storage device may be implemented for this purpose.

The memory 108 includes a data repository with data relating to multibit digital halftoning, as well as other data/information desired by the entity representing the user system 102 of FIG. 1. The memory 108 is logically addressable as a consolidated data source across a distributed environment that includes one or more networks 106. Information stored in the memory 108 may be retrieved and manipulated via the user system 102. The data repository includes one or more databases containing, e.g., look up tables (LUTs) and image files, as well as other related information. The image files store bit maps containing pixel data for corresponding images.

The user system 102 depicted in the system of FIG. 1 may be implemented using one or more servers operating in response to a computer program stored in a storage medium accessible by the server. The user system 102 may operate as a network server to communicate with network entities, such as scanners, printers, or other devices (e.g., printer device 104). The user system 102 handles sending and receiving information to and from the network entities and can perform associated tasks. The user system 102 may also include a firewall to prevent unauthorized access to the user system 102 and enforce any limitations on authorized access. For instance, an administrator may have access to the entire system and have authority to modify portions of the system. A firewall may be implemented using conventional hardware and/or software as is known in the art.

The user system 102 may also operate as an application server. The user system 102 executes one or more computer programs to provide multibit digital halftoning of images. The multibit digital halftoning processes may be integrated within an existing software application (e.g., printer driver) utilized by end users (e.g., operators of the user system 102). Alternatively, the multibit digital halftoning processes may be implemented independent of any particular software program whereby a software application providing the multibit digital halftoning processes functions on top of one or more existing software applications. As shown in FIG. 1, for purposes of illustration, the multibit digital halftoning is implemented by an application 112 (also referred to as "halftoning engine") executing on the user system 102.

It will be understood that the multibit digital halftoning processes described in FIG. 1 may be implemented in hardware, software, or a combination thereof.

In an exemplary embodiment, the printer device 104 is a multibit or multitone device, which may include additional functionality such as scanning and facsimile components. The multibit or multitone printer device 104 (also referred to herein as "printer") may be, e.g., an inkjet printer, a laser printer, a dot-matrix printer, a thermal printer, or an electrophotographic printer, to name a few. As shown in FIG. 1, the printer 104 is in communication with the user system 102 over networks 106; however, it will be understood that the printer 104 may be directly connected to the user system 102 via, e.g., cabling. In one exemplary embodiment, the printer 104 performs the multibit digital halftoning processes in conjunction with the user system 102 (e.g., via halftoning engine 112). The printer 104 may be executing a multibit print engine that receives look up tables produced by the multibit digital halftoning processes described herein. The print engine may then produce the halftone images from these look up tables. These look up tables are described further herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A user system 102 may be coupled to network entities (e.g., printer 104) through multiple networks (e.g., intranet and Internet) so that not all network entities are coupled to the user system 102 through the same network. One or more user systems 102 may be connected to the networks 106 in a wireless fashion.

As described above, the multibit digital halftoning processes provide a flexible solution to digital halftoning processes. The multibit digital halftoning processes facilitate the reduction of the total number of transactions (e.g., among look up tables) and may result in an overall improvement of the total system performance. In addition, this footprint reduction is suitable for utilizing hardware accelerators, such as general-purpose computing on graphics processing units (GPGPU), Cell Broadband Engine® (i.e., a microprocessor architecture jointly developed under an alliance referred to as STI consisting of Sony®, Toshiba®, and IBM®), as well as other systems having small local memories.

Figure 2:
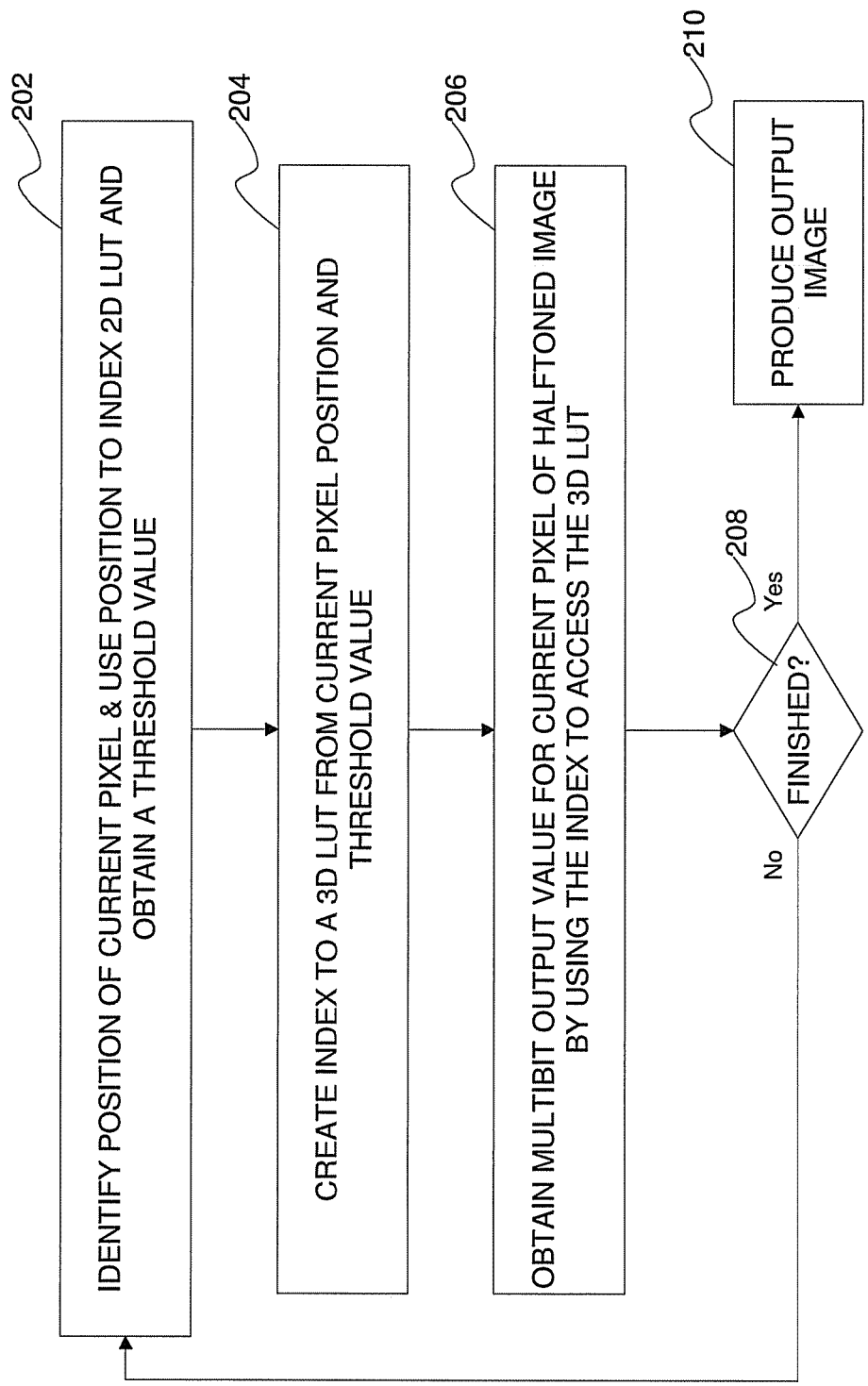
FIG. 2 is a flow diagram describing a process for implementing the multibit digital halftoning in accordance with exemplary embodiments.
Figure 3:
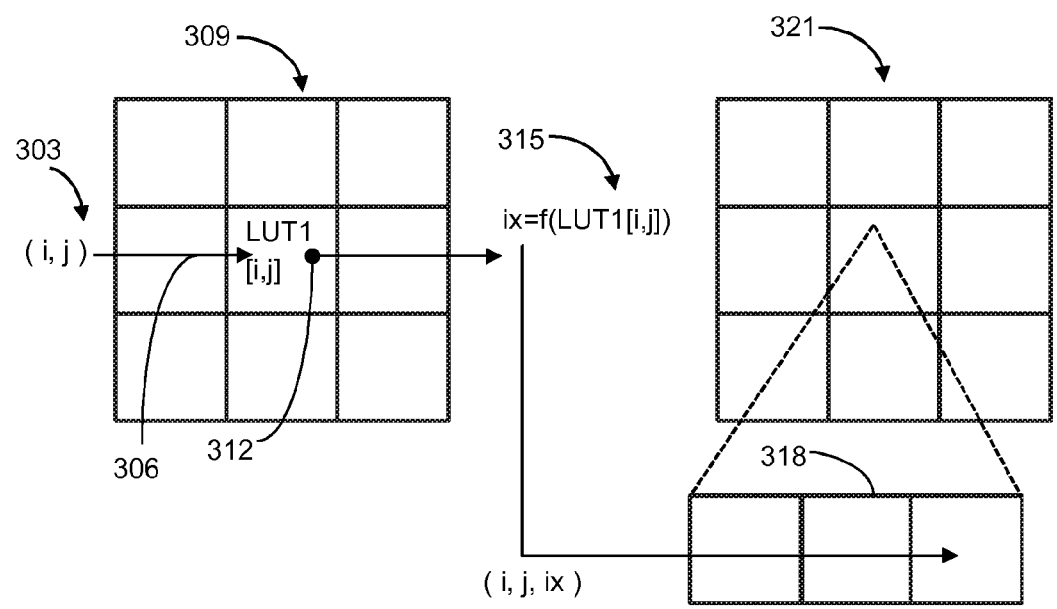
FIG. 3 is a diagram illustrating relationships between input image data, a 2D lookup table, a 3D lookup table, and output image data. A pixel position 303 of an input image is used as an index 306 into a 2D lookup table 309. The indexed position in the 2D lookup table 309 represents a threshold value 312. The threshold value 312, along with pixel position 303, is used to create an index 315 for the third dimension 318 of the 3D lookup table 321. The pixel position 303 indexes into the first and second dimension (row and column) of the 3D lookup table 321, while the created index 315 indexes into the third dimension 318. The value at the indexed position of the 3D lookup table 321 is used to obtain the pixel for the output image.

Turning now to FIG. 2, an exemplary process for implementing digital halftoning will now be described. For purposes of illustration, it is assumed that an image subject to the exemplary halftoning processes has been scanned to, and stored in, the memory 108 of the user system 102. In an exemplary embodiment, the halftoning engine 112 implements a two-part process as will now be described.

At step 202, the halftoning engine 112 identifies the position of the current pixel of the image and uses this position to index a first look up table, which is a 2D lookup table, to find a threshold value. An image is represented as a 2D array of contone (e.g., 8 bit/print element, PEL) pixels, and the position of a pixel is specified by the row and column of the pixel placement with respect to the image. The row and column may be represented by the variables 'r' and 'c', respectively. A picture element (PEL) represents the smallest element of a printed image (e.g., in halftoning applications, the smallest element is a halftone cell).

Turning back to FIG. 2, the threshold value may be interpreted as the median or mean of a set of gray levels used in producing halftone images. In one exemplary embodiment, a threshold array for binary halftoning is used as this threshold value, as described further herein.

At step 204, this threshold value, and the position value of the current pixel are used by the halftoning engine 112 to create an index. For example, in one exemplary embodiment, the index may be formed using the difference between the pixel position and the corresponding threshold value from the 2D LUT. The resulting value may be scaled by a constant factor, offset by a constant and then rounded, ceiling-ed, or floored. It will be understood by those skilled in the art that other equations for creating the index may be utilized in order to realize the exemplary embodiments of the invention.

This index, along with the position of the current pixel, indexes a second look up table, which is a 3D lookup table. The 3D look up table is reduced in size, as compared to existing 3D look up tables, and is described further below.

At step 206, the halftoning engine 112 uses the second look up table (3D look up table) to obtain a multibit output value for the current pixel of the halftoned image. Thus, the halftoning engine 112 computes an index that is smaller than the range of the value of a pixel (where a pixel typically has 256 values=8 bits). Accordingly, this index will result in a reduced 3D lookup table. As indicated above, the 2D and 3D look up tables may be sent to the printer 104, whereby the printer produces a halftone image using the tables. Alternatively, the 2D and 3D look up tables may be used by the halftoning engine 112 to produce a halftone image that is displayed on a computer screen of the user system 102.

At step 208, the halftoning engine 112 determines whether there are additional pixels in the image. If so, the process returns to step 202. Otherwise, at step 210, the halftoning engine 112 produces a halftone representation of the image from the output values derived via steps 202-206.

Pseudocode for a program implementing the digital halftoning processes will now be described in an exemplary embodiment.

INPUT: image, a 2D array of size r by c (where 'r' is a row and 'c' is a column). Each pixel of the image is denoted as IMAGE[i][j], INPUT: a 2D look up table of size m by n and a 3D look up table: a 3D array of size m by n by p. Each element is denoted as LUT1[i][j], LUT2[i][j][k] for the 2D LUT and 3D LUT, respectively.

OUTPUT: halftone image: a 2D array of size r by c. Each pixel of the halftoned image is denoted by OUTIMAGE[i][j],

```
Main loop:
  FOR i = 1 to r
    FOR j = 1 to c
      i2 = i mod m
      j2 = j mod n
      k = IMAGE [i][j];
      index = Round ((k – LUT1[i2][j2])/FACTOR + p/2);
      if (index > p) index = p;
      if (index < 1) index = 1;
      OUTIMAGE[i][j] = LUT2[i2][j2][index];
    ENDFOR
  ENDFOR
```

As indicated above, the index to be constructed is represented as index=round(k–LUT1[i2][j2]+p/2); however, this representation is for illustrative purposes. It will be understood that other equations may be utilized for the index, e.g., the "round" operation may be replaced by the "floor" or "ceiling" operation. As described above, two LUTs are used to approach the performance of a larger LUT of size m by n by d, where d is the range of the input pixels, typically d=256. Further, the constant FACTOR is optimized based on the particular look up table. The constant FACTOR may be interpreted as the spread of values to which the pixel positions are compared and is used to further reduce the size of the smaller 3D lookup table.

When splitting a large 3D LUT into two smaller LUTs (i.e., the first and second LUTs described above), an additional calculation for the "index" value is provided using the first look up table (i.e., LUT1). However, this very small calculation may be executed in cache memory of the user system 102 resulting in a reduction of the number of transactions occurring between the user system 102 and the main memory 108. The reduction of the total number of transactions may result in an overall improvement of the total system performance. In addition, this footprint reduction is suitable for utilizing hardware accelerators, as well as other systems having small local memories.

Pseudocode for generating the first look up table and the second look up table above from a larger, existing 3D look up table will now be described in an exemplary embodiment.

```
INPUT: BigLUT of size m by n by k (BigLUT is the larger 3D look up table to be split)
  OUTPUT: LUT1 of size m by n and LUT2 of size m by n by p
  FOR i = 1 to m
    FOR j = 1 to n
```

Take the k values BigLUT(i,j,1), BigLUT(i,j,2), ..., BigLUT(i,j,k) and find an index r such that BigLUT(i,j,r) is closes to the mean (or median) of these values and assign r to LUT1(i,j);

```
    FOR q = 1 to p
      index = LUT1(i,j) + FACTOR * (q – 1 – p/2);
      IF index is less than 1 or larger than k, THEN set index to 1 or k respectively. ENDIF
    END
  END
END
```

As indicated above, a threshold array for binary halftoning may be used as the threshold value in step 202. The first look up table (LUT1) may be implemented in a similar manner as that known for use in binary halftoning. For example, a threshold array halftone result where the threshold level is determined to limit the output to black or white. Thus, the index value that indexes into the second look up table (LUT2) represents the difference between the binary halftoning threshold array and the image data, which provides an extra dimension of what plane to access in the 3D look up table (LUT2) in order to access the exposure levels. The index value computed is the value representing a location (plane wise) in the first look up table (LUT1), and represents the difference between the threshold array value for that individual pixel and the image data itself.

Also, as shown in the above-referenced pseudocode, a scaling factor is applied that scales the difference between the threshold array value and the image data into a smaller set of levels in order to access the exposure levels. A bias term (p/2) is used in the pseudocode so each one of the scaling factors could be selected. The pseudo line which states "index=round (k–LUT1[i2][j2])/FACTOR+p/2" represents the difference between the image data and the threshold array value for the individual pixel at [i2][j2], which is divided by the constant FACTOR, thereby producing a scaled difference.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for implementing digital halftoning of an image, the method comprising:
   for each pixel in the image:
      indexing a two-dimensional look up table using a position of the pixel;
      identifying a threshold value for the pixel from the two-dimensional look up table;
      creating an index that indexes a three-dimensional lookup table using the threshold value and the position of the pixel; and
      obtaining an output value for the pixel by indexing the three-dimensional look up table via the index; and
   producing a halftone representation of the image from output values for corresponding pixels,
   wherein the threshold value is a mean of a set of gray levels used to output to a halftone image.

2. The method of claim 1, wherein the image is a scanned image representing a two-dimensional array of contone pixels.

3. The method of claim 1, wherein the index is created by calculating a difference between the position of the pixel and a corresponding threshold value, and scaling a result of the calculating by a constant factor.

4. The method of claim 3, wherein the constant factor is a range of threshold values to which pixel positions are compared.

5. The method of claim 1, further comprising:
   outputting the halftone representation of the image to a printing device.

6. The method of claim 1, further comprising:
   outputting the halftone representation of the image to a computer display screen.

7. A system for implementing digital halftoning of an image, comprising:
   a computer processing device; and
   a halftoning engine executing on the computer processing device, the halftoning engine implementing a method, comprising:
   for each pixel in the image:
      indexing a two-dimensional look up table using a position of the pixel;
      identifying a threshold value for the pixel from the two-dimensional look up table;
      creating an index that indexes a three-dimensional lookup table using the threshold value and the position of the pixel; and
      obtaining an output value for the pixel by indexing the three-dimensional look up table via the index; and
   producing a halftone representation of the image from output values for corresponding pixels,
   wherein the threshold value is a mean of a set of gray levels used to output to a halftone image.

8. The system of claim 7, wherein the image is a scanned image representing a two-dimensional array of contone pixels.

9. The system of claim 7, wherein the index is created by calculating a difference between the position of the pixel and a corresponding threshold value, and scaling a result of the calculating by a constant factor.

10. The system of claim 9, wherein the constant factor is a range of threshold values to which pixel positions are compared.

11. The system of claim 7, wherein the method further comprises:
    outputting the halftone representation of the image to a printing device.

12. The system of claim 7, wherein the method further comprises:
    outputting the halftone representation of the image to a computer display screen.

13. A computer program product for implementing digital halftoning of an image includes a non-transitory computer readable storage medium having computer readable program code embodied therewith, the computer readable program code configured to implement a method, the method comprising:
    for each pixel in the image:
       indexing a two-dimensional look up table using a position of the pixel;
       identifying a threshold value for the pixel from the two-dimensional look up table;
       creating an index that indexes a three-dimensional lookup table using the threshold value and the position of the pixel; and
       obtaining an output value for the pixel by indexing the three-dimensional look up table via the index; and
    producing a halftone representation of the image from output values for corresponding pixels,
    wherein the threshold value is a mean of a set of gray levels used to output to a halftone image.

14. The computer program product of claim 13, wherein the image is a scanned image representing a two-dimensional array of contone pixels.

15. The computer program product of claim 13, wherein the index is created by calculating a difference between the position of the pixel and a corresponding threshold value, and scaling a result of the calculating by a constant factor.

16. The computer program product of claim 15, wherein the constant factor is a range of threshold values to which pixel positions are compared.

17. The computer program product of claim 13, wherein the method further comprises:
    outputting the halftone representation of the image to a printing device.

18. The computer program product of claim 13, wherein the method further comprises:
    outputting the halftone representation of the image to a computer display screen.

* * * * *